(12) United States Patent
Mi et al.

(10) Patent No.: US 12,096,416 B2
(45) Date of Patent: Sep. 17, 2024

(54) METHOD AND APPARATUS FOR CONTROL INFORMATION MONITORING

(71) Applicant: HUAWEI TECHNOLOGIES CO., LTD., Guangdong (CN)

(72) Inventors: Xiang Mi, Beijing (CN); Xiaolei Tie, Shanghai (CN); Baokun Shan, Shenzhen (CN); Zhihu Luo, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 515 days.

(21) Appl. No.: 17/402,053

(22) Filed: Aug. 13, 2021

(65) Prior Publication Data
US 2021/0377966 A1 Dec. 2, 2021

Related U.S. Application Data

(63) Continuation of application No. PCT/CN2019/075276, filed on Feb. 15, 2019.

(51) Int. Cl.
*H04W 74/0833* (2024.01)
*H04L 1/08* (2006.01)
(Continued)

(52) U.S. Cl.
CPC ........... *H04W 72/12* (2013.01); *H04W 72/23* (2023.01)

(58) Field of Classification Search
CPC . H04W 72/12; H04W 72/23; H04W 74/0833; H04L 1/08
See application file for complete search history.

(56) References Cited

U.S. PATENT DOCUMENTS

| 2011/0286444 A1 | 11/2011 | Petrovykh |
| 2014/0082198 A1 | 3/2014 | Blattner et al. |

(Continued)

FOREIGN PATENT DOCUMENTS

| CN | 105210442 A | 12/2015 | |
| CN | 108513714 | * 9/2018 | .............. H04W 4/70 |

(Continued)

OTHER PUBLICATIONS

3GPP TSG-RAN meeting#101bis, R2-1805868 Title: indication of mapping rule stored and removed. (Year: 2018).*

(Continued)

*Primary Examiner* — Faruk Hamza
*Assistant Examiner* — Abusayeed M Haque
(74) *Attorney, Agent, or Firm* — WOMBLE BOND DICKINSON (US) LLP

(57) ABSTRACT

A monitoring method and an apparatus are provided. The method includes transmitting, by a terminal device, first information based on a first repetition number, where the first repetition number is less than or equal to a second repetition number, and the second repetition number is a maximum repeat transmission number of the first information. The method also includes determining, by the terminal device, a scheduling end moment of the first information based on the second repetition number, where the scheduling end moment of the first information is a transmission end moment of the first information when the first information is transmitted based on the second repetition number. The method further includes starting or restarting, by the terminal device, a timer at the scheduling end moment of the first information, and monitoring a PDCCH search space before the timer expires or stops.

9 Claims, 9 Drawing Sheets

(51) Int. Cl.
*H04W 72/12* (2023.01)
*H04W 72/23* (2023.01)

(56) References Cited

U.S. PATENT DOCUMENTS

| | | | | |
|---|---|---|---|---|
| 2018/0167883 | A1* | 6/2018 | Guo | H04B 7/0617 |
| 2020/0245395 | A1* | 7/2020 | Zhang | H04L 5/0053 |
| 2021/0297139 | A1* | 9/2021 | Kwon | H04W 52/028 |
| 2022/0022265 | A1* | 1/2022 | Selvaganapathy | H04L 1/1896 |
| 2022/0053385 | A1* | 2/2022 | Li | H04B 7/0617 |
| 2022/0131908 | A1* | 4/2022 | Oyman | H04L 65/1073 |

FOREIGN PATENT DOCUMENTS

| | | |
|---|---|---|
| CN | 108513714 A | 9/2018 |
| CN | 108616993 A | 10/2018 |
| CN | 108781148 A | 11/2018 |
| CN | 108811094 A | 11/2018 |
| CN | 109040976 A | 12/2018 |
| WO | 2019033017 A1 | 2/2019 |

OTHER PUBLICATIONS

3GPP TSG-RAN meeting#86bis, R1-1608742 Title:on sDCI design (Year: 2016).*

3GPP TSG RAN WG1 Meeting #93, R1-1806194, Remaining issues on early data transmission for NB-IoT,ZTE,Busan, Korea, May 21 25, 2018,total 4 pages.

3GPP TS 36.321 V15.4.0:"3rd Generation Partnership Project;Technical Specification Group Radio Access Network; Evolved Universal Terrestrial Radio Access (E-UTRA);Medium Access Control (MAC) protocol specification(Release 15)",Dec. 2018,total 131 pages.

3GPP TS 36.331 V14.9.0:"3rd Generation Partnership Project;Technical Specification Group Radio Access Network; Evolved Universal Terrestrial Radio Access (E-UTRA);Radio Resource Control (RRC)Protocol specification(Release 14)",Dec. 2018,total 773 pages.

3GPP TS 36.213 V16.0.0 :3rd Generation Partnership Project;Technical Specification Group Radio Access Network; Evolved Universal Terrestrial Radio Access (E-UTRA);Physical layer procedures(Release 16) Dec. 2019 total 568 pages.

Xiaomi Communications: "Discussion on remaining issues of EDT for NB-IoT", 3GPP Draft; R1-1807137,May 20, 2018, XP051442335,total 4 pages.

Kyocera: "Consideration of T300 and Contention Resolution Timer for EDT in eFeMTC and FeNB-IoT", 3GPP Draft; R2-1803415,Feb. 16, 2018,XP051400509,total 4 pages.

5g et al: "Medium Access Control (MAC) protocol specification",ETSI TS 138 321 VI5.2.0, Sep. 1, 2018 (Sep. 1, 2018), pp. 1-74, XP055700190.

* cited by examiner

METHOD AND APPARATUS FOR CONTROL INFORMATION MONITORING

CROSS-REFERENCE TO RELATED APPLICATIONS

This application is a continuation of International Application No. PCT/CN2019/075276, filed on Feb. 15, 2019, the disclosure of which is hereby incorporated by reference in its entirety.

TECHNICAL FIELD

This application relates to the field of wireless communication technologies, and in particular, to a monitoring method and an apparatus.

BACKGROUND

A narrow band internet of things (NB-IoT) is a network oriented to machine type communication (MTC), and is an important network in the future communication field. Currently, an early data transmission (EDT) technology is introduced in the NB-IoT. An EDT is a data transmission technology that is based on a random access process. In an EDT process, a terminal device may transmit uplink data by using a message 3, to avoid a procedure such as radio resource control (RRC) connection establishment/release, and further reduce power consumption of the terminal device.

In the EDT process, the terminal device monitors NPDCCH search space until a timer expires, to receive a message 4 or retransmission scheduling. If the terminal device detects downlink control information (DCI) in the NPDCCH search space, the DCI schedules the message 4, and the message 4 includes an identifier of the terminal device, the terminal device may determine that random access succeeds; otherwise, the terminal device may determine that random access fails. It is stipulated in a conventional technology that a start moment of the timer is an actual transmission end moment of the message 3.

During the EDT, a repetition number of actual transmissions performed by the terminal device to send the message 3 may be less than or equal to a scheduling value of a base station, and the terminal device does not notify the base station of the repetition number. Therefore, the base station can determine the repetition number of the actual transmissions of the message 3 only through blind detection. Due to interference in a wireless network environment and the like, a repetition number that is of transmissions of the message 3 and that is determined by the base station through blind detection may be inconsistent with the repetition number of the actual transmissions of the message 3 sent by the terminal device. For example, the terminal device repeatedly transmits the message 3 for 64 times. Correspondingly, an actual transmission end moment, namely, a first actual transmission end moment, of the message 3 on a terminal device side is a moment corresponding to an end of the 64 repeat transmissions. However, the base station may determine, through blind detection, that a repetition number of transmissions of the message 3 is 32. Correspondingly, an actual transmission end moment, namely, a second actual transmission end moment, of the message 3 on a base station side is a moment corresponding to an end of the 32 repeat transmissions.

Because the base station and the terminal device respectively start the timer at the first actual transmission end moment and the second actual transmission end moment, when the repetition number that is of transmissions of the message 3 and that is determined by the base station through blind detection is inconsistent with the repetition number of the actual transmissions of the message 3 sent by the terminal device, the base station and the terminal device start the timer at different moments. Consequently, after the terminal device sends the message 3, a time window in which the base station sends the message 4 or the retransmission scheduling and a time window in which the terminal device monitors the narrowband physical downlink control channel (NPDCCH) search space may only partially overlap or may not overlap at all. The terminal device may be unable to detect the downlink control information (DCI) in the NPDCCH search space, and the terminal device considers that the random access fails because no DCI is detected. Therefore, the terminal device initiates random access again. Consequently, the terminal device wastes resources and increases power consumption, and a transmission delay is increased. Other information transmission methods may have similar problems.

SUMMARY

An objective of implementations of this application is to provide a monitoring method and an apparatus, so that a terminal device can detect DCI when a base station sends the DCI.

According to a first aspect, an embodiment of this application provides a monitoring method, including: transmitting, by a terminal device, first information based on a first repetition number, where the first repetition number is less than or equal to a second repetition number, and the second repetition number is a maximum repeat transmission number of the first information; determining, by the terminal device, a scheduling end moment of the first information based on the second repetition number, where the scheduling end moment of the first information is a transmission end moment of the first information when the first information is transmitted based on the second repetition number; and starting or restarting, by the terminal device, a timer at the scheduling end moment of the first information, and monitoring physical downlink control channel (PDCCH) search space before the timer expires or stops.

According to the foregoing method, although the terminal device transmits the first information based on a first repeat transmission number, the terminal device still starts or restarts the timer at the scheduling end moment of the first information, and monitors the PDCCH search space, to keep consistent with behavior of a network device. When the network device sends DCI in the PDCCH search space, the terminal device can detect the DCI.

In a possible embodiment, the first information is a message 3 in an early data transmission (EDT) process.

In a possible embodiment, the transmitting, by a terminal device, first information based on a first repetition number includes: transmitting, by the terminal device, the first information on a preconfigured uplink resource (PUR) based on the first repetition number.

In a possible embodiment, before the transmitting, by a terminal device, first information based on a first repetition number, the method further includes: receiving, by the terminal device, first indication information from the network device, where the first indication information is used to indicate the second repetition number.

According to a second aspect, an embodiment of this application provides a monitoring method, including:

demodulating, by a network device, first information from a terminal device, where the first information is transmitted based on a first repetition number, the first repetition number is less than or equal to a second repetition number, and the second repetition number is a maximum repeat transmission number of the first information; and starting or restarting, by the network device, a timer at a scheduling end moment of the first information, and sending, in physical downlink control channel PDCCH search space before the timer expires or stops, second information in response to the first information, where the scheduling end moment of the first information is a transmission end moment of the first information when the first information is transmitted based on the second repetition number.

According to the foregoing method, although the terminal device transmits the first information based on the first repeat transmission number, it is agreed on that the network device still starts or restarts the timer at the scheduling end moment of the first information, and sends the second information before the timer expires or stops, to keep consistent with behavior of the terminal device. When the network device sends the second information in the PDCCH search space, the terminal device can detect the second information.

In a possible embodiment, the first information is a message 3 in an early data transmission EDT process.

In a possible embodiment, the method further includes: sending, by the network device, first indication information to the terminal device, where the first indication information is used to indicate the second repetition number.

According to a third aspect, an embodiment of this application provides a monitoring method, including:

transmitting, by a terminal device, first information based on a first repetition number, where the first repetition number is less than or equal to a second repetition number, and the second repetition number is a maximum repeat transmission number of the first information; and starting or restarting, by the terminal device, a timer at an actual transmission end moment of the first information, and monitoring physical downlink control channel PDCCH search space before the timer expires or stops, where when the first repetition number is less than a second repetition number, timing duration of the timer is a sum of first duration and second duration, the first duration is preset duration or duration configured by the network device, the second duration is a difference between third duration and fourth duration, the third duration is a duration required for transmitting the first information based on the second repetition number, and the fourth duration is a duration required for transmitting the first information based on the first repetition number.

According to the foregoing method, the terminal device starts or restarts the timer at the actual transmission end moment of the first information, and the network device also starts or restarts the timer at the actual transmission end moment of the first information when the network device successfully demodulates the first information, to keep behavior of the terminal device consistent with behavior of the network device. When the network device sends second information in the PDCCH search space, the terminal device can detect the second information, to determine whether the first information is successfully demodulated.

In a possible embodiment, the monitoring, by the terminal device, physical downlink control channel PDCCH search space before the timer expires or stops includes:

before the timer expires or stops, skipping monitoring, by the terminal device, the PDCCH search space within fifth duration, and monitoring the PDCCH search space within sixth duration, where the timing duration of the timer is a sum of the fifth duration and the sixth duration, the fifth duration uses the actual transmission end moment as a start time, and the sixth duration uses a moment at which the timer expires or stops as an end time.

In a possible embodiment, the fifth duration is duration of three subframes.

In a possible embodiment, the first information is a message 3 in an early data transmission (EDT) process.

In a possible embodiment, the transmitting, by a terminal device, first information based on a first repetition number includes:

transmitting, by the terminal device, the first information on a preconfigured uplink resource (PUR) based on the first repetition number.

According to a fourth aspect, an embodiment of this application provides a monitoring method, including: demodulating, by a network device, first information from a terminal device, where the first information is transmitted based on a first repetition number, the first repetition number is less than or equal to a second repetition number, and the second repetition number is a maximum repeat transmission number of the first information; and starting or restarting, by the network device, a timer at an actual transmission end moment of the first information when the first information is successfully demodulated, and sending, in physical downlink control channel PDCCH search space before the timer expires or stops, second information in response to the first information, where timing duration of the timer is a sum of first duration and second duration, the first duration is preset duration or duration configured by the network device, the second duration is a difference between third duration and fourth duration, the third duration is a duration required for transmitting the first information based on the second repetition number, and the fourth duration is a duration required for transmitting the first information based on the first repetition number.

According to the foregoing method, it is agreed on that the terminal device starts or restarts the timer at the actual transmission end moment of the first information, and the network device starts or restarts the timer at the actual transmission end moment of the first information when the network device successfully demodulates the first information, to keep behavior of the terminal device consistent with behavior of the network device. When the network device sends the second information in the PDCCH search space, the terminal device can detect the second information, to determine whether the first information is successfully demodulated.

In a possible embodiment, the first information is a message 3 in an early data transmission (EDT) process, or the first information is information transmitted by using a preconfigured uplink resource (PUR).

In a possible embodiment, when the first information is the message 3, the second information is a message 4 in the EDT process.

In a possible embodiment, when the first information is the information transmitted by using the preconfigured uplink resource (PUR), the second information is used to indicate that the network device successfully demodulates the first information, or is used to indicate that the terminal device clears a hybrid automatic repeat request (HARQ) buffer corresponding to the first information.

In a possible embodiment, the network device starts or restarts the timer at a scheduling end moment of the first information when demodulation of the first information fails, and sends, in the PDCCH search space before the timer expires or stops, third information in response to the first information, where the third information is used to schedule a retransmission of the first information, or is used to indicate that the network device fails to demodulate the first information, the timing duration of the timer is the preset duration or the duration configured by the network device, and the scheduling end moment of the first information is a transmission end moment of the first information when the first information is transmitted based on the second repetition number.

According to a fifth aspect, an embodiment of this application provides a monitoring method, including: transmitting, by a terminal device, first information based on a first repetition number, where the first repetition number is less than or equal to a second repetition number, and the second repetition number is a maximum repeat transmission number of the first information; and starting or restarting, by the terminal device, a timer at a transmission start moment of the first information, and monitoring physical downlink control channel (PDCCH) search space before the timer expires or stops, where timing duration of the timer is a sum of seventh duration and eighth duration, the seventh duration is preset duration or duration configured by a network device, and the eighth duration is a duration required for transmitting the first information based on the second repetition number.

According to the foregoing method, it is agreed on that the terminal device starts or restarts the timer at the transmission start moment of the first information, to keep behavior of the terminal device consistent with behavior of the network device. When the network device sends second information in the PDCCH search space, the terminal device can detect the second information, to determine whether the first information is successfully demodulated.

In a possible embodiment, the monitoring, by the terminal device, physical downlink control channel (PDCCH) search space before the timer expires or stops includes:

before the timer expires or stops, skipping monitoring, by the terminal device, the PDCCH search space within ninth duration, and monitoring the PDCCH search space within tenth duration, where the timing duration of the timer is a sum of the ninth duration and the tenth duration, the ninth duration uses the transmission start moment of the first information as a start time, and the tenth duration uses a moment at which the timer expires or stops as an end time.

In a possible design, the ninth duration is a sum of duration(s) required for transmitting the first information based on the first repetition number and duration of three subframes.

In a possible design, the first information is a message 3 in an early data transmission (EDT) process, or the first information is a message transmitted by using a preconfigured uplink resource (PUR).

According to a sixth aspect, an embodiment of this application provides a monitoring method, including: demodulating, by a network device, first information from a terminal device, where the first information is transmitted based on a first repetition number, the first repetition number is less than or equal to a second repetition number, and the second repetition number is a maximum repeat transmission number of the first information; and starting or restarting, by the network device, a timer at an actual transmission end moment of the first information, and sending, in physical downlink control channel (PDCCH) search space before the timer expires or stops, second information in response to the first information, where timing duration of the timer is a sum of first duration and second duration, the first duration is preset duration or duration configured by the network device, and the second duration is a duration required for transmitting the first information based on the second repetition number.

According to the foregoing method, it is agreed on that the terminal device starts or restarts the timer at a transmission start moment of the first information, and the network device also starts or restarts the timer at the transmission start moment of the first information, to keep behavior of the terminal device consistent with behavior of the network device. When the network device sends the second information in the PDCCH search space, the terminal device can detect the second information, to determine whether the first information is successfully demodulated.

In a possible embodiment, the first information is a message 3 in an early data transmission (EDT) process, or the first information is information transmitted by using a preconfigured uplink resource (PUR).

In a possible embodiment, when the first information is successfully demodulated, and the first information is the message 3, the second information is a message 4 in the EDT process.

In a possible embodiment, when the first information is successfully demodulated, and the first information is the information transmitted by using the PUR, the second information is used to indicate that the network device successfully demodulates the first information, or is used to indicate that the terminal device clears a hybrid automatic repeat request (HARQ) buffer corresponding to the first information.

In a possible embodiment, when demodulation of the first information fails, the first information is used to schedule a retransmission of the first information, or is used to indicate that the network device fails to demodulate the first information.

According to a seventh aspect, an embodiment of this application provides a monitoring method, including: sending, by a terminal device, first information; and starting or restarting, by the terminal device, a timer at an actual transmission end moment of the first information, and before the timer expires or stops, skipping monitoring PDCCH search space within fifth duration, and monitoring the PDCCH search space within sixth duration, where timing duration of the timer is a sum of the fifth duration and the sixth duration, the fifth duration uses the actual transmission end moment as a start time, and the sixth duration uses a moment at which the timer expires or stops as an end time.

In a possible embodiment, the fifth duration is duration of three subframes.

According to an eighth aspect, an embodiment of this application provides a monitoring method, including:

demodulating, by a network device, first information from a terminal device, where the first information is transmitted based on a first repetition number, the first repetition number is less than or equal to a second repetition number, and the second repetition number is a maximum repeat transmission number of the first information; and starting or restarting, by the network device, a timer at an actual transmission end moment of the first information when the first information is successfully demodulated, and before the timer expires or stops, skipping sending, within fifth duration, second information in response to the first information, and sending, within sixth duration, the second information in response to the first information, where timing duration of the timer is a sum of the fifth duration and the sixth duration, the fifth duration uses the actual transmission end moment as a start time, and the sixth duration uses a moment at which the timer expires or stops as an end time.

In a possible embodiment, the network device starts or restarts the timer at a scheduling end moment of the first information when demodulation of the first information fails, and before the timer expires or stops, skips sending, within the fifth duration, the second information in response to the first information, and sends, within the sixth duration, the second information in response to the first information.

In a possible embodiment, the fifth duration is duration of three subframes.

According to a ninth aspect, this application provides an apparatus. The apparatus has a function of implementing the terminal device in the first aspect to the eighth aspect. For example, the apparatus includes a module, a unit, or a means corresponding to the steps performed by the terminal device in the first aspect to the eighth aspect. The function, the unit, or the means may be implemented by using software, or may be implemented by using hardware, or may be implemented by hardware executing corresponding software.

In a possible embodiment, the apparatus includes a processing unit and a transceiver unit. Functions performed by the processing unit and the transceiver unit may correspond to the steps performed by the terminal device in the first aspect to the eighth aspect.

In a possible embodiment, the apparatus includes a processor, and may further include a transceiver. The transceiver is configured to send and receive a signal, and the processor executes program instructions, to complete the method performed by the terminal device in any one of the possible designs or implementations in the first aspect to the eighth aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data that are/is necessary for implementing the functions of the terminal device in the first aspect to the eighth aspect. The processor may execute the computer program instructions stored in the memory, to complete the method performed by the terminal device in any one of the possible designs or implementations in the first aspect to the eighth aspect.

According to an eighth aspect, this application provides an apparatus. The apparatus has a function of implementing the network device in the first aspect to the eighth aspect. For example, the apparatus includes a module, a unit, or a means corresponding to the steps performed by the network device in the first aspect to the eighth aspect. The function, the unit, or the means may be implemented by using software, or may be implemented by using hardware, or may be implemented by hardware executing corresponding software.

In a possible embodiment, the apparatus includes a processing unit and a transceiver unit. Functions performed by the processing unit and the transceiver unit may correspond to the steps performed by the network device in any one of possible designs or implementations in the first aspect to the eighth aspect.

In another possible embodiment, the communication apparatus includes a processor, and may further include a transceiver. The transceiver is configured to send and receive a signal, and the processor executes program instructions, to complete the method performed by the network side device in any one of the possible designs or implementations in the first aspect to the eighth aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data that are/is necessary for implementing a function of the network device in any one of the possible designs or implementations in the first aspect to the eighth aspect. The processor may execute the computer program instructions stored in the memory, to complete the method performed by the network device in any one of the possible designs or implementations in the first aspect to the eighth aspect.

An embodiment of this application provides a computer-readable storage medium. The computer storage medium stores computer-readable instructions. When a computer reads and executes the computer-readable instructions, a communication apparatus is enabled to perform the method in any one of the foregoing possible designs.

An embodiment of this application provides a computer program product. When a computer reads and executes the computer program product, a communication apparatus is enabled to perform the method in any one of the foregoing possible designs.

An embodiment of this application provides a chip. The chip is connected to a memory, and is configured to read and execute a software program stored in the memory, to implement the method in any one of the foregoing possible designs.

DESCRIPTION OF EMBODIMENTS

The following further describes in detail embodiments of this application with reference to the accompanying drawings.

The embodiments of this application may be applied to various mobile communication systems, for example, a new radio (NR) system, a global system for mobile communication (GSM) system, a code division multiple access (CDMA) system, a wideband code division multiple access (WCDMA) system, a long term evolution (LTE) system, a long term evolution-advanced (LTE-A) system, and another communication system. Specifically, this is not limited herein.

Figure 1:
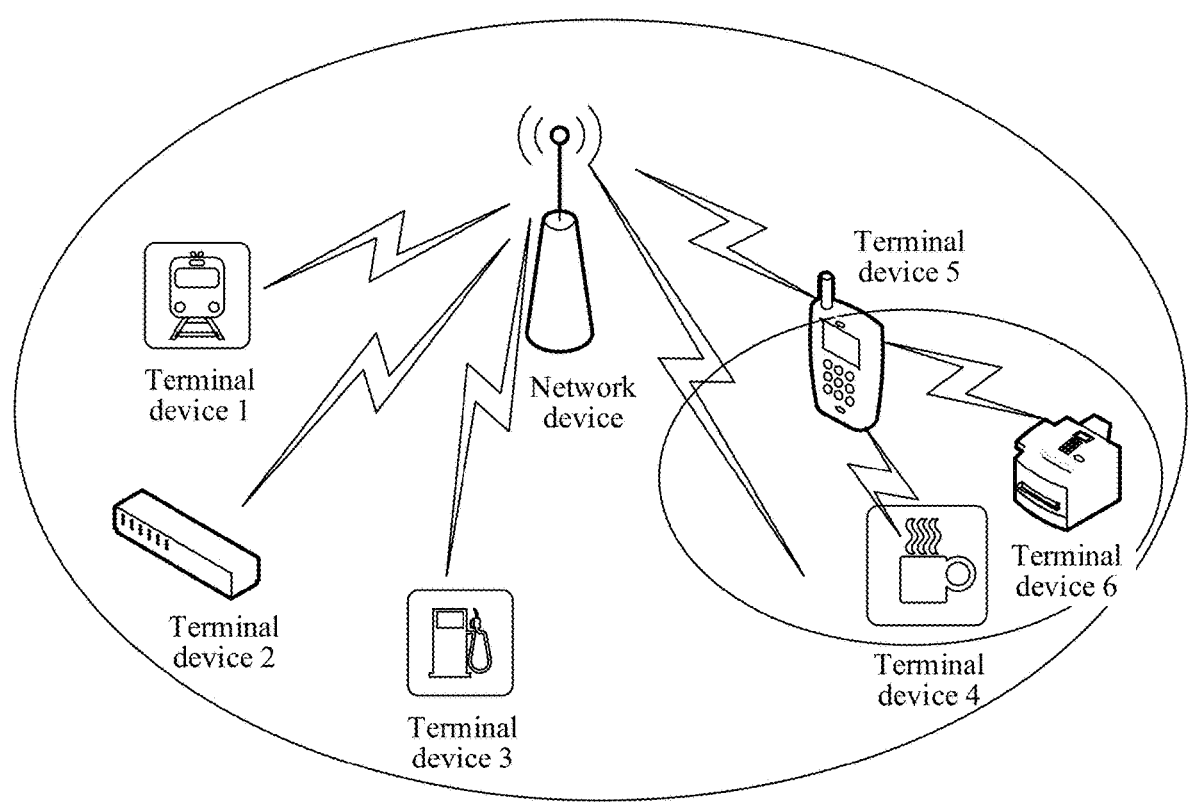
FIG. 1 is a schematic diagram of a communication system applicable to a communication method according to an embodiment of this application.

For ease of understanding the embodiments of this application, a communication system shown in FIG. 1 is first used as an example to describe in detail a communication system applicable to the embodiments of this application. FIG. 1 is a schematic diagram of a communication system applicable to a communication method according to an embodiment of this application. As shown in FIG. 1, a communication system includes a network device and a terminal device 1 to a terminal device 6. In the communication system, the terminal device 1 to the terminal device 6 may send uplink data to the network device, or the network device may send downlink data to the terminal device 1 to the terminal device 6. In addition, a communication system may alternatively include the terminal device 4 to the terminal device 6. In this case, in the communication system, the network device may send downlink data of the terminal device 4 and the terminal device 6 to the terminal device 5, and then the terminal device 5 forwards the downlink data to the terminal device 4 and the terminal device 6.

Specifically, a terminal device in the embodiments of this application is a device that provides a user with voice and/or data connectivity and that has a wireless transceiving function or a chip that can be disposed in the device. The terminal device may communicate with one or more core networks through a radio access network (radio access network, RAN). The terminal device may be a mobile phone, a tablet computer (e.g., a Pad), a computer with a wireless transceiving function, a personal digital assistant (PDA), a virtual reality (VR) terminal, an augmented reality (AR) terminal, a wireless terminal in industrial control (industrial control), a wireless terminal in self driving, a wireless terminal in telemedicine (e.g., remote medical), a wireless terminal in a smart grid, a wireless terminal in transportation safety, a wireless terminal in a smart city, a wireless terminal in a smart home, or the like. An application scenario is not limited in the embodiments of this application. In this application, the foregoing terminal device and the chip that can be disposed in the foregoing terminal device are collectively referred to as a terminal device. The terminal device in the embodiments of this application may also be referred to as user equipment (UE), a user terminal, an access terminal, a subscriber unit, a subscriber station, a mobile station, a remote station, a remote terminal, a mobile device, a wireless communication device, a user agent, or a user apparatus.

A network device is a device having a wireless transceiving function or a chip that can be disposed in the device. The network device may be configured to mutually convert a received over-the-air frame and an internet protocol (IP) packet, and serve as a router between a terminal device and a remaining part of an access network, and may be further configured to coordinate attribute management of an air interface. The device includes but is not limited to an evolved NodeB (eNB), a radio network controller (radio network controller, RNC), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, a transmission point (e.g., a transmission and reception point (TRP) or a transmission point (TP)), or the like, and may alternatively be a fifth generation base station (gNB) or a transmission point (a TRP or a TP) in a 5G (new radio (NR)) system, one antenna panel or one group (including a plurality of antenna panels) of antenna panels of a base station in the 5G system, or the like.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

In the embodiments of this application, an NB-IoT network scenario in a wireless communication network is used as an example to describe some scenarios. It should be noted that the solutions in the embodiments of this application may further be applied to another wireless communication network, and a corresponding name may also be replaced with a name of a corresponding function in the another wireless communication network.

The embodiments of this application provide a plurality of monitoring methods, to resolve a problem of how a terminal device monitors PDCCH search space. The following separately describes the methods.

It should be noted that "monitoring the PDCCH search space" may also be described in another manner, for example, may be referred to as "monitoring a PDCCH" or referred to as "monitoring a PDCCH candidate set" or the like. The foregoing expressions all have a same meaning. For ease of description, in the embodiments of this application, all the foregoing expressions are collectively referred to as "monitoring the PDCCH search space".

Correspondingly, the PDCCH may also be referred to as a "narrow physical downlink control channel (NPDCCH)". For ease of description, in the embodiments of this application, both the PDCCH and the NPDCCH are collectively referred to as a "PDCCH".

Figure 2:
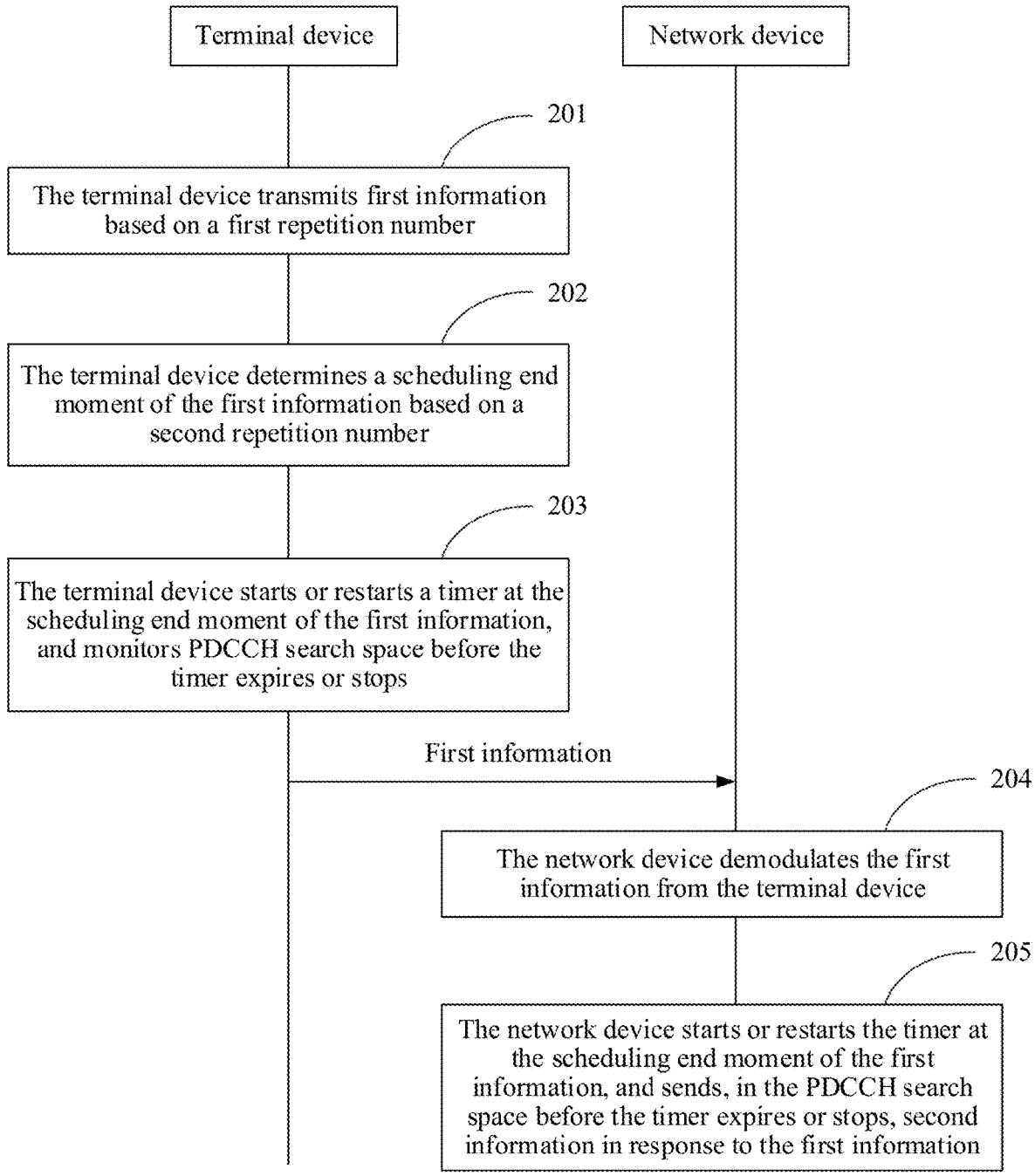
FIG. 2 is a schematic flowchart of a monitoring method according to an embodiment of this application.

In a first possible embodiment, FIG. 2 is a schematic flowchart of a monitoring method according to an embodiment of this application. Refer to FIG. 2. The method includes the following steps.

Step 201: A terminal device transmits first information based on a first repetition number.

The first repetition number is less than or equal to a second repetition number, and the second repetition number is a maximum repeat transmission number of the first information.

Step 202: The terminal device determines a scheduling end moment of the first information based on the second repetition number.

The scheduling end moment of the first information is a transmission end moment of the first information when the first information is transmitted based on the second repetition number.

Step 203: The terminal device starts or restarts a timer at the scheduling end moment of the first information, and monitors PDCCH search space before the timer expires or stops.

Step 204: A network device demodulates the first information from the terminal device.

Step 205: The network device starts or restarts the timer at the scheduling end moment of the first information, and sends, in the PDCCH search space before the timer expires or stops, second information in response to the first information.

In step 201, a second repeat transmission number may be configured by the network device, or may be agreed on in advance. For example, the terminal device may receive first indication information from the network device. The first indication information is used to indicate the second repetition number. It should be noted that, the second repeat transmission number is not necessarily a repeat transmission number specifically configured for the first information. That is, a maximum repeat transmission number of any message or information transmitted by the terminal device may be the second repeat transmission number. After determining the second repeat transmission number, the terminal device may determine, based on an actual situation, a first repeat transmission number for transmitting the first information. Certainly, the first repeat transmission number determined by the terminal device cannot be greater than the second repeat transmission number. For example, the second repeat transmission number preconfigured by the network device is 128. When the terminal device determines that a transport block size (TBS) of the first information is relatively small, and the first information does not need to be repeatedly transmitted for 128 times, and only needs to be repeatedly transmitted for 44 times, the first information is repeatedly transmitted only for 44 times when the terminal device transmits the first information. It should be noted that, the terminal device does not send, to the network device, the first repetition number for transmitting the first information because this may consume a large quantity of uplink resources and a large amount of power consumption, especially in an NB-IoT network scenario.

Figure 3:
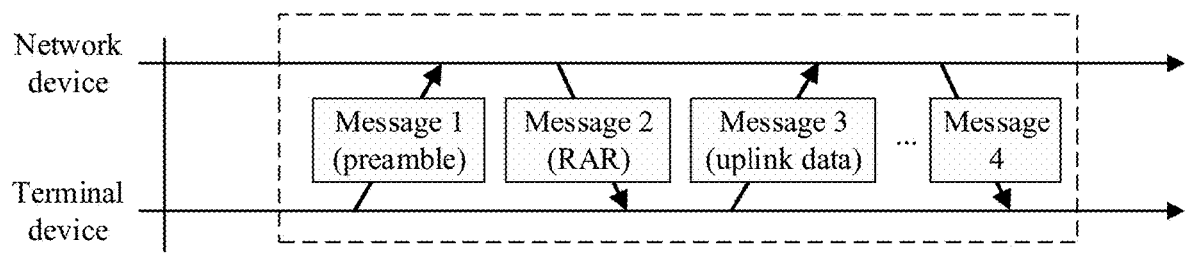
FIG. 3 is a schematic diagram of an EDT process in a conventional technology.

This embodiment of this application may be applied to a plurality of scenarios. A possible scenario is an EDT. In this scenario, the first information may be a message 3 in an EDT process. It should be noted that, as shown in FIG. 3, the following messages may exist in the EDT process: The terminal device sends a preamble to the network device, and the preamble is a message 1; the network device sends a random access response message, namely, a message 2, to the terminal device; the terminal device sends a message 3 to the network device, where the message 3 includes uplink data of the terminal device. If the network device correctly receives the message 3, the network device sends a message 4 to the terminal device, or if the network device does not correctly receive the message 3, the network device sends retransmission scheduling of the message 3 to the terminal device. In FIG. 3, an example in which the network device sends the message 4 is used for description. The foregoing is merely an example. For specific content of the EDT process, refer to a description in a conventional technology. Details are not described herein again.

Another possible scenario is an uplink scheduling-free transmission. In this scenario, the terminal device transmits the first information on a preconfigured uplink resource (PUR) based on the first repetition number. That is, the first information is transmitted by the terminal device by using the PUR.

Figure 4:
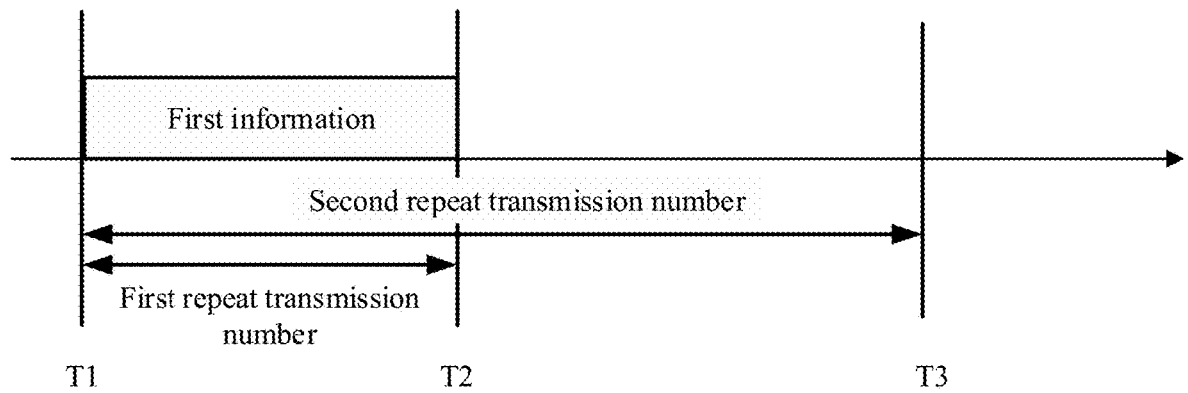
FIG. 4 is a schematic diagram of transmission timing according to an embodiment of this application.

In step 202, for an actual transmission end moment of the first information and the scheduling end moment of the first information, refer to FIG. 4. In FIG. 4, the terminal device starts transmitting the first information at a moment T1. When the terminal device transmits the first information based on the first repeat transmission number, a transmission of the first information ends at a moment T2. The moment T2 is the actual transmission end moment of the first information. Duration between the moment T1 and the moment T2 is a duration required for transmitting the first information based on the first repeat transmission number. A moment T3 is the scheduling end moment, namely, a transmission end moment at which the terminal device transmits the first information based on the second repeat transmission number, of the first information. Duration between the moment T1 and the moment T3 is a duration required for transmitting the first information based on the second repeat transmission number.

Figure 5:
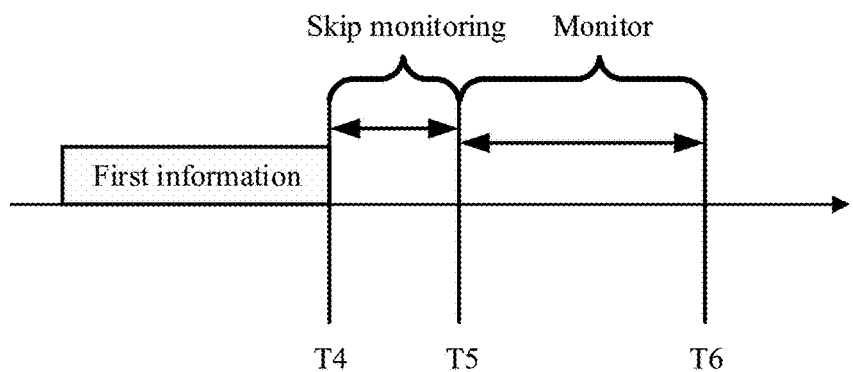
FIG. 5 is a schematic diagram of monitoring timing according to an embodiment of this application.

In step 203, when starting or restarting the timer, the terminal device may not immediately monitor the PDCCH search space, but monitors the PDCCH search space between a start moment of an $X^{th}$ subframe after the last subframe for transmitting the first information and a moment at which the timer expires or stops. A value of X may be determined based on the actual situation, for example, may be 3. For example, as shown in FIG. 5, the actual transmission end moment at which the terminal device transmits the first information based on the first repeat transmission number is a moment T4. The start moment of the $X^{th}$ subframe after the last subframe in which the terminal device transmits the first information is a moment T5. The moment at which the timer expires or stops is a moment T6. The terminal device does not monitor the PDCCH search space between the moment T4 and the moment T5, and monitors the PDCCH search space between the moment T5 and the moment T6.

In an embodiment of a possible implementation, in an EDT scenario, in a process of monitoring the PDCCH search space, the terminal device may detect DCI sent by the network device. The DCI schedules the message 4. In this way, the terminal device may receive the message 4 based on scheduling information of the DCI. Alternatively, the DCI is used to indicate retransmission scheduling of the first information. In this way, the terminal device needs to retransmit the first information.

In an embodiment of a possible implementation, in an uplink scheduling-free transmission scenario, in a process of monitoring the PDCCH search space, the terminal device may detect a feedback message sent by the network device. Specific content of the feedback message is not limited in this embodiment of this application. The feedback message may be used to indicate that the first information is successfully received, or may be used to schedule a retransmission of the first information or the like. Details are not described herein again.

In step 205, in an embodiment of a possible implementation, in the EDT scenario, the first information may be the message 3 in the EDT process. When the first information is successfully demodulated, the second information may be the message 4 in the EDT process. Correspondingly, when demodulation of the first information fails, the second information may be a retransmission scheduling of the first information.

In an embodiment of a possible implementation, in the uplink scheduling-free transmission scenario, the first information may be information transmitted by using the PUR. When the first information is successfully demodulated, the second information may be used to indicate that the network device successfully demodulates the first information. Alternatively, the second information may be used to indicate that the terminal device clears a hybrid automatic repeat request (HARQ) buffer corresponding to the first information. In this case, it is equivalent to implicitly indicating that the first information is successfully demodulated. When demodulation of the first information fails, the second information may be further used to indicate that the network device fails to demodulate the first information, or the second information may be used to schedule the retransmission of the first information.

According to the foregoing method, although the terminal device transmits the first information based on the first repeat transmission number, the terminal device still starts or restarts the timer at the scheduling end moment of the first information, and monitors the PDCCH search space, to keep consistent with behavior of the network device. When the network device sends the DCI in the PDCCH search space, the terminal device can detect the DCI.

In the foregoing embodiment, although the terminal device transmits the first information based on the first repeat transmission number, the terminal device still starts or restarts the timer at the scheduling end moment of the first information. In an embodiment of a possible implementation, the terminal device may alternatively start or restart the timer at the actual transmission end moment of the first information. The following provides a detailed description.

Figure 6:
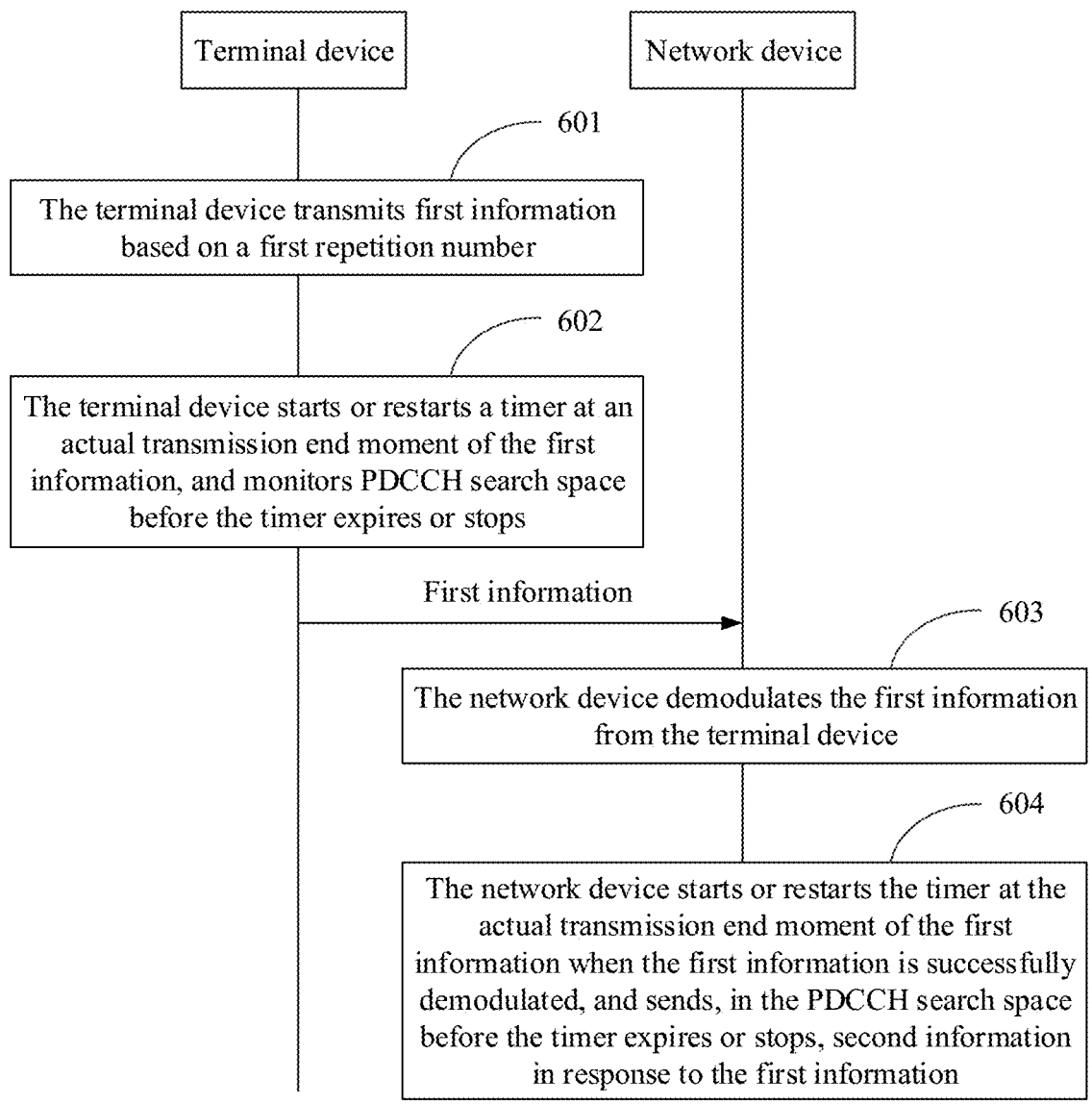
FIG. 6 is a schematic flowchart of a monitoring method according to an embodiment of this application.

In a second possible embodiment, FIG. 6 is a schematic flowchart of a monitoring method according to an embodiment of this application. Refer to FIG. 6. The method includes the following steps.

Step 601: A terminal device transmits first information based on a first repetition number.

The first repetition number is less than or equal to a second repetition number, and the second repetition number is a maximum repeat transmission number of the first information.

Step 602: The terminal device starts or restarts a timer at an actual transmission end moment of the first information, and monitors PDCCH search space before the timer expires or stops.

When the first repetition number is less than the second repetition number, timing duration of the timer is a sum of first duration and second duration, the first duration is preset duration or duration configured by a network device, the second duration is a difference between third duration and fourth duration, the third duration is a duration required for transmitting the first information based on the second repetition number, and the fourth duration is a duration required for transmitting the first information based on the first repetition number.

Step 603: The network device demodulates the first information from the terminal device.

Step 604: The network device starts or restarts the timer at the actual transmission end moment of the first information when the first information is successfully demodulated, and sends, in the PDCCH search space before the timer expires or stops, second information in response to the first information.

For detailed content of step 601, refer to the description in step 201. Details are not described herein again.

Figure 7:
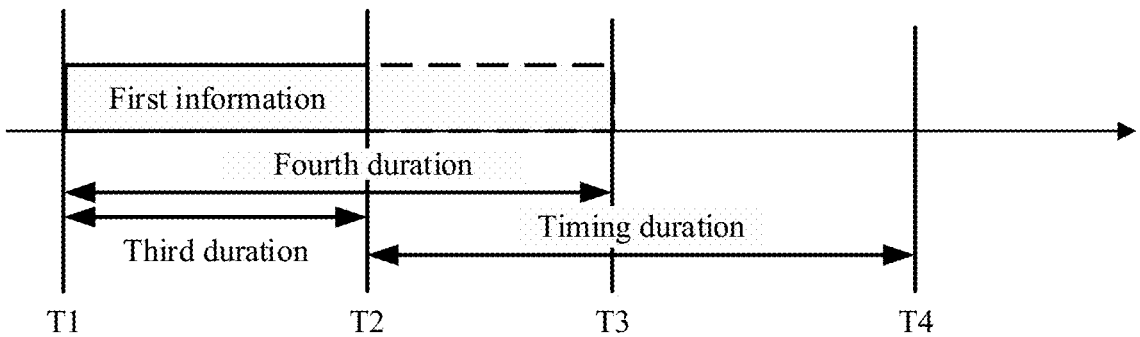
FIG. 7 is a schematic diagram of transmission timing according to an embodiment of this application.

In step 602, the actual transmission end moment of the first information is a transmission end moment of the first information when the first information is transmitted based on the first repetition number. For example, as shown in FIG. 7, the terminal device starts transmitting the first information at a moment T1. When the terminal device transmits the first information based on a first repeat transmission number, a transmission of the first information ends at a moment T2. The moment T2 is the actual transmission end moment of the first information. Duration between the moment T1 and the moment T2 is a duration, namely, third duration, required for transmitting the first information based on the first repeat transmission number. Duration between the moment T1 and a moment T3 is a duration, namely, fourth duration, required for transmitting the first information based on a second repeat transmission number. Duration between the moment T3 and a moment T4 is the preset duration or the duration configured by the network device. At the moment T4, the timer expires or stops. In conclusion, the timing duration of the timer is duration between the moment T2 and the moment T4.

Figure 8:
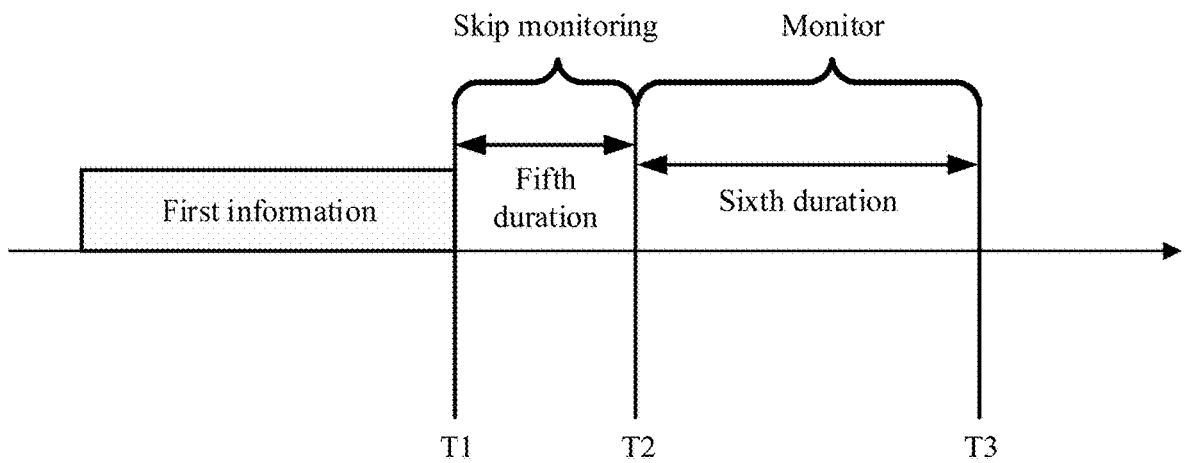
FIG. 8 is a schematic diagram of monitoring timing according to an embodiment of this application.

In an embodiment of a possible implementation, when starting or restarting the timer, the terminal device may not immediately monitor the PDCCH search space, but does not monitor the PDCCH search space within fifth duration, and monitors the PDCCH search space within sixth duration. The timing duration of the timer is a sum of the fifth duration and the sixth duration. The fifth duration uses the actual transmission end moment as a start time, and the sixth duration uses a moment at which the timer expires or stops as an end time. A value of the fifth duration may be determined based on an actual situation, for example, may be duration of three subframes. For example, as shown in FIG. 8, the actual transmission end moment at which the terminal device transmits the first information based on the first repeat transmission number is a moment T1. Duration between the moment T1 and a moment T2 is the fifth duration. The moment at which the timer expires or stops is a moment T3. Duration between the moment T2 and the moment T3 is sixth duration. The terminal device starts or restarts the timer at the moment T1. After the terminal device starts or restarts the timer, the terminal device does not monitor the PDCCH search space between the moment T1 and the moment T2, and monitors the PDCCH search space between the moment T2 and the moment T3.

How the network device specifically demodulates the first information in step 603 is not limited in this embodiment of this application. Details are not described herein again.

In step 604, in an embodiment of a possible implementation, in an EDT scenario, the first information may be a message 3 in an EDT process. When the first information is successfully demodulated, the second information may be a message 4 in the EDT process. Correspondingly, when demodulation of the first information fails, the second information may be a retransmission scheduling of the first information.

In an embodiment of a possible implementation, in an uplink scheduling-free transmission scenario, the first information may be information transmitted by using a PUR. When the first information is successfully demodulated, the second information may be used to indicate that the network device successfully demodulates the first information. Alternatively, the second information may be used to indicate that the terminal device clears a hybrid automatic repeat request (HARQ) buffer corresponding to the first information. In this case, it is equivalent to implicitly indicating that the first information is successfully demodulated. When demodulation of the first information fails, the second information may be further used to indicate that the network device fails to demodulate the first information.

In a possible implementation, the network device may start or restart the timer at a scheduling end moment of the first information when demodulation of the first information fails, and send, in the PDCCH search space before the timer expires or stops, third information in response to the first information.

The third information is used to schedule a retransmission of the first information, or is used to indicate that the network device fails to demodulate the first information, the timing duration of the timer is the preset duration or the duration configured by the network device, and the scheduling end moment of the first information is a transmission end moment of the first information when the first information is transmitted based on the second repetition number.

According to the foregoing method, the terminal device starts or restarts the timer at the actual transmission end moment of the first information, and the network device also starts or restarts the timer at the actual transmission end moment of the first information when the network device successfully demodulates the first information, to keep behavior of the terminal device consistent with behavior of the network device. When the network device sends the second information in the PDCCH search space, the terminal device can detect the second information, to determine whether the first information is successfully demodulated.

In an embodiment of a possible implementation, the terminal device may alternatively start or restart the timer at a transmission start moment of the first information. The following provides a detailed description.

Figure 9:
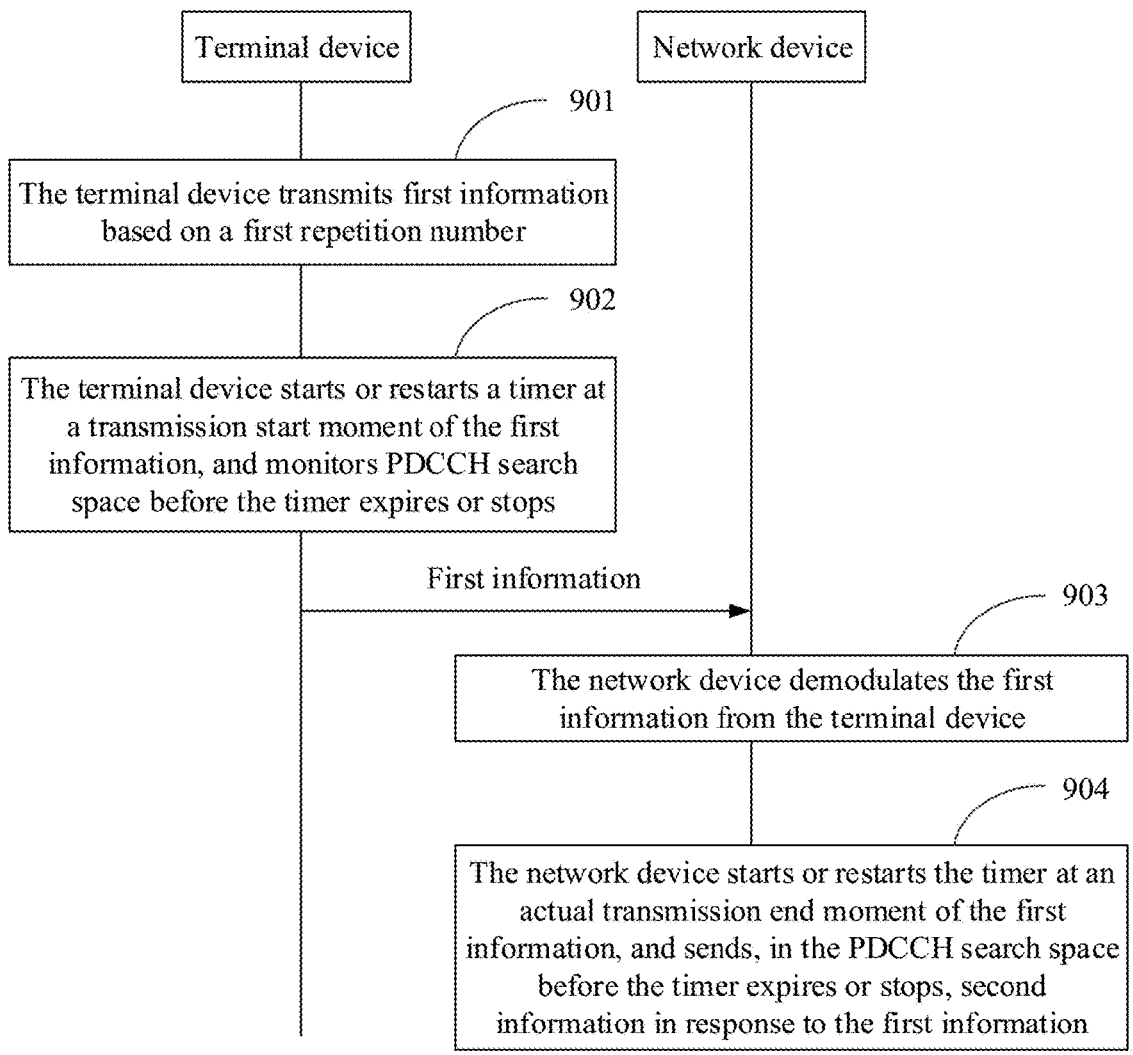
FIG. 9 is a schematic flowchart of a monitoring method according to an embodiment of this application.

In a third possible embodiment, FIG. 9 is a schematic flowchart of a monitoring method according to an embodiment of this application. Refer to FIG. 9. The method includes the following steps.

Step 901: A terminal device transmits first information based on a first repetition number.

The first repetition number is less than or equal to a second repetition number, and the second repetition number is a maximum repeat transmission number of the first information.

Step 902: The terminal device starts or restarts a timer at a transmission start moment of the first information, and monitors PDCCH search space before the timer expires or stops.

Timing duration of the timer is a sum of seventh duration and eighth duration. The seventh duration is preset duration or duration configured by a network device. The eighth duration is a duration required for transmitting the first information based on the second repetition number.

Step 903: The network device demodulates the first information from the terminal device.

Step 904: The network device starts or restarts the timer at an actual transmission end moment of the first information, and sends, in the PDCCH search space before the timer expires or stops, second information in response to the first information.

For detailed content of step 901, refer to the description in step 201. Details are not described herein again.

Figure 10:
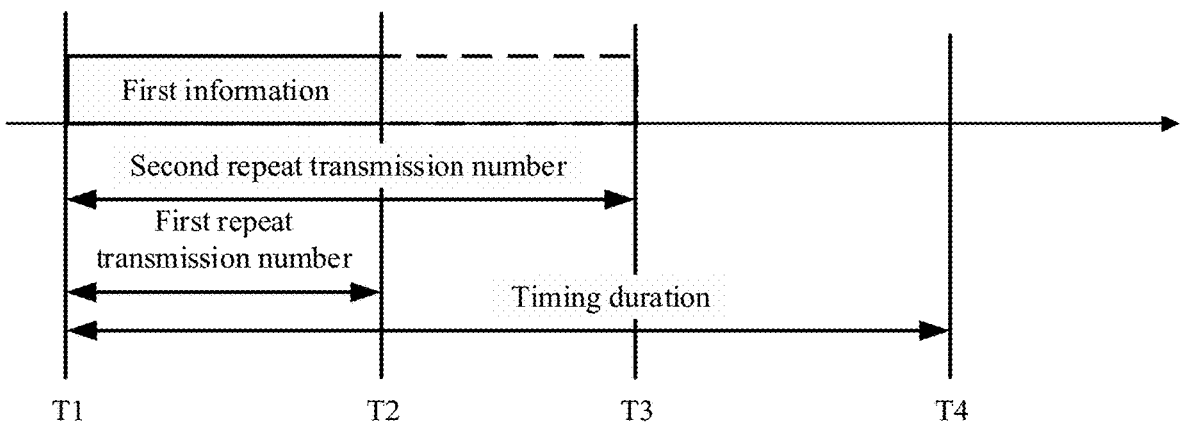
FIG. 10 is a schematic diagram of transmission timing according to an embodiment of this application.

In step 902, for example, as shown in FIG. 10, a moment T1 is the transmission start moment of the first information. The terminal device starts transmitting the first information at the moment T1. When the terminal device transmits the first information based on a first repeat transmission number, a transmission of the first information ends at a moment T2. The moment T2 is the actual transmission end moment of the first information. Duration between the moment T1 and the moment T2 is a duration required for transmitting the first information based on the first repeat transmission number. A moment T3 is a scheduling end moment of the first information. Duration between the moment T1 and the moment T3 is a duration required for transmitting the first information based on a second repeat transmission number. Duration between the moment T3 and a moment T4 is the preset duration or the duration configured by the network device. At the moment T4, the timer expires or stops. In conclusion, the timing duration of the timer is duration between the moment T1 and the moment T4.

In an embodiment of a possible implementation, when starting or restarting the timer, the terminal device may not immediately monitor the PDCCH search space, but does not monitor the PDCCH search space within ninth duration, and monitors the PDCCH search space within tenth duration. The timing duration of the timer is a sum of the ninth duration and the tenth duration. The ninth duration uses the transmission start moment of the first information as a start time. The tenth duration uses a moment at which the timer expires or stops as an end time. A value of the ninth duration may be determined based on an actual situation, for example, may be a sum of duration(s) required for transmitting the first information based on the first repetition number and duration of three subframes.

Figure 11:
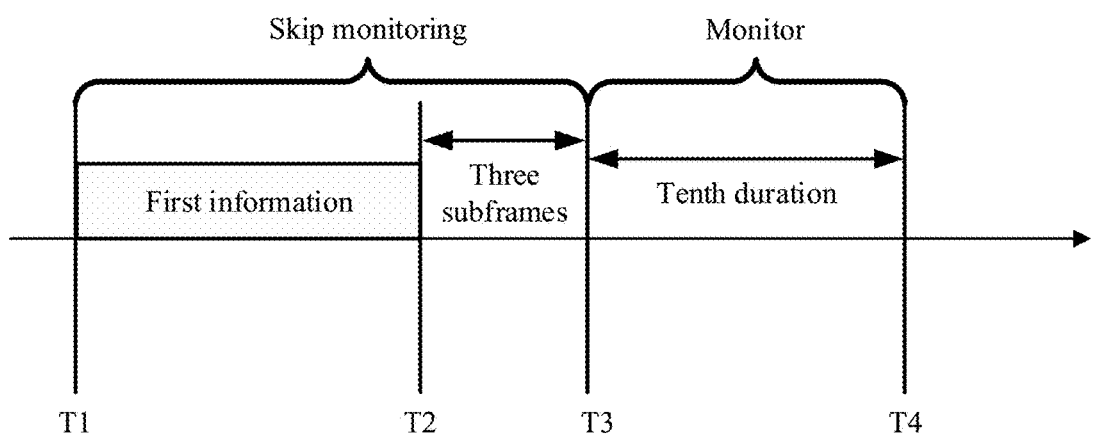
FIG. 11 is a schematic diagram of monitoring timing according to an embodiment of this application.

For example, as shown in FIG. 11, the terminal device starts transmitting the first information at a moment T1. The actual transmission end moment at which the terminal device transmits the first information based on the first repeat transmission number is a moment T2. Duration between the moment T1 and a moment T3 is the duration of the three subframes. The moment at which the timer expires or stops is a moment T4. Duration between the moment T3 and the moment T4 is the tenth duration. The terminal device starts or restarts the timer at the moment T1. After the terminal device starts or restarts the timer, the terminal device does not monitor the PDCCH search space between the moment T1 and the moment T3, and monitors the PDCCH search space between the moment T3 and the moment T4.

For detailed content of step 903 and step 904, refer to descriptions in step 603 and step 604. Details are not described herein again.

Figure 12:
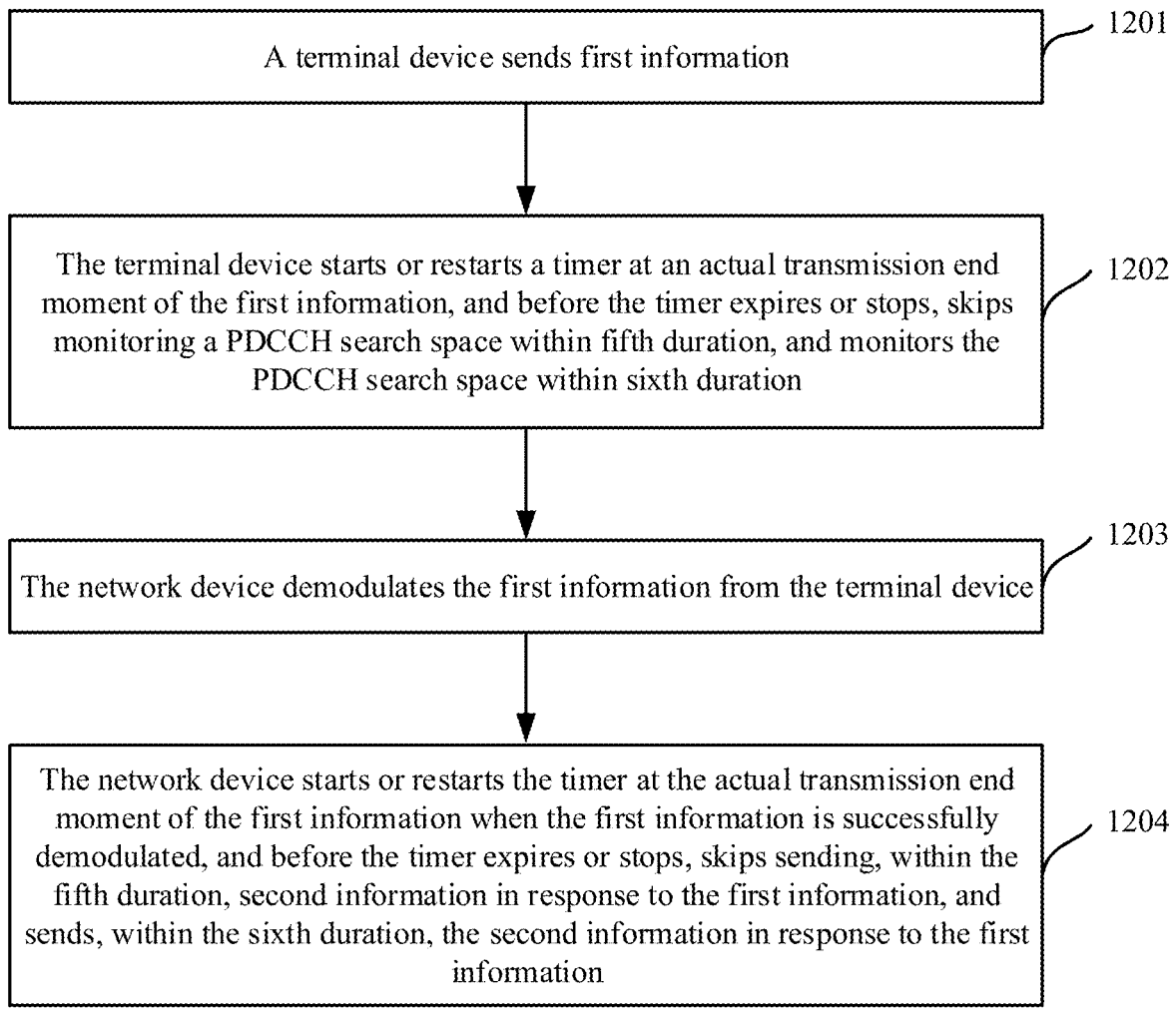
FIG. 12 is a schematic flowchart of a monitoring method according to an embodiment of this application.

In a fourth possible embodiment, FIG. 12 is a schematic flowchart of a monitoring method according to an embodiment of this application. Refer to FIG. 12. The method includes the following steps.

Step 1201: A terminal device sends first information.

The terminal device may transmit the first information based on a first repetition number, where the first repetition number is less than or equal to a second repetition number, and the second repetition number is a maximum repeat transmission number of the first information. For details, refer to the description in step 201. Details are not described herein again.

Step 1202: The terminal device starts or restarts a timer at an actual transmission end moment of the first information, and before the timer expires or stops, skips monitoring a PDCCH search space within fifth duration, and monitors the PDCCH search space within sixth duration.

Timing duration of the timer is a sum of the fifth duration and the sixth duration. The fifth duration uses the actual transmission end moment as a start time. The sixth duration uses a moment at which the timer expires or stops as an end time.

Step 1203: A network device demodulates the first information from the terminal device.

The first information is transmitted based on the first repetition number. The first repetition number is less than or equal to the second repetition number. The second repetition number is a maximum repeat transmission number of the first information.

Step 1204: The network device starts or restarts the timer at the actual transmission end moment of the first information when the first information is successfully demodulated, and before the timer expires or stops, skips sending, within the fifth duration, second information in response to the first information, and sends, within the sixth duration, the second information in response to the first information.

The timing duration of the timer is the sum of the fifth duration and the sixth duration. The fifth duration uses the actual transmission end moment as the start time. The sixth duration uses the moment at which the timer expires or stops as the end time.

For example, the network device starts or restarts the timer at a scheduling end moment of the first information when demodulation of the first information fails, and before the timer expires or stops, skips sending, within the fifth duration, the second information in response to the first information, and sends, within the sixth duration, the second information in response to the first information.

For example, the fifth duration is duration of three subframes.

For specific content of step 1202 to step 1204, refer to descriptions in step 602 to step 604. Details are not described herein again.

Figure 13:
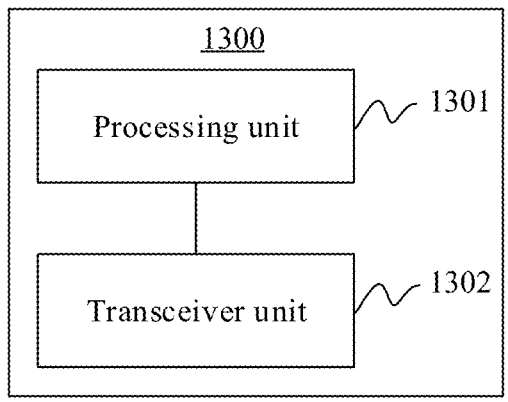
FIG. 13 is a schematic structural diagram of a communication apparatus according to an embodiment of this application.

FIG. 13 is a schematic structural diagram of a communication apparatus according to an embodiment of this application. The communication apparatus may be configured to perform an action of the terminal device or the network device in the foregoing method embodiments. The communication apparatus 1300 includes a processing unit 1301 and a transceiver unit 1302.

When the communication apparatus 1300 performs an action of the terminal device in FIG. 2, the transceiver unit 1302 is configured to transmit first information based on a first repetition number, where the first repetition number is less than or equal to a second repetition number, and the second repetition number is a maximum repeat transmission number of the first information;

the processing unit is configured to: determine a scheduling end moment of the first information based on the second repetition number, where the scheduling end moment of the first information is a transmission end moment of the first information when the first information is transmitted based on the second repetition number; and start or restart a timer at the scheduling end moment of the first information; and the processing unit is configured to monitor PDCCH search space by using the transceiver unit 1302 before the timer expires or stops.

In an embodiment of a possible design, the first information is a message 3 in an EDT process.

When the communication apparatus 1300 performs an action of the network device in FIG. 2, the processing unit 1301 is configured to: demodulate first information from a terminal device, where the first information is transmitted based on a first repetition number, the first repetition number is less than or equal to a second repetition number, and the second repetition number is a maximum repeat transmission number of the first information; and start or restart a timer at a scheduling end moment of the first information, where the scheduling end moment of the first information is a transmission end moment of the first information when the first information is transmitted based on the second repetition number; and the transceiver unit 1302 is configured to send, in physical downlink control channel PDCCH search space before the timer expires or stops, second information in response to the first information.

In an embodiment of a possible design, the first information is a message 3 in an early data transmission EDT process.

In an embodiment of a possible design, the transceiver unit 1302 is further configured to:

send first indication information to the terminal device, where the first indication information is used to indicate the second repetition number.

When the communication apparatus 1300 performs an action of the terminal device in FIG. 6, the transceiver unit 1302 is configured to transmit first information based on a first repetition number, where the first repetition number is less than or equal to a second repetition number, and the second repetition number is a maximum repeat transmission number of the first information;

the processing unit 1301 is configured to start or restart a timer at an actual transmission end moment of the first information, where when the first repetition number is less than a second repetition number, timing duration of the timer is a sum of first duration and second duration, the first duration is preset duration or duration configured by the network device, the second duration is a difference between third duration and fourth duration, the third duration is a duration required for transmitting the first information based on the second repetition number, and the fourth duration is a duration required for transmitting the first information based on the first repetition number; and the processing unit 1301 is configured to monitor PDCCH search space by using the transceiver unit 1302 before the timer expires or stops.

In an embodiment of a possible design, the processing unit 1301 is specifically configured to:

before the timer expires or stops, skip monitoring the PDCCH search space within fifth duration, and monitor the PDCCH search space within sixth duration by using the transceiver unit 1302, where the timing duration of the timer is a sum of the fifth duration and the sixth duration, the fifth duration uses the actual transmission end moment as a start time, and the sixth duration uses a moment at which the timer expires or stops as an end time.

When the communication apparatus 1300 performs an action of the network device in FIG. 6, the processing unit 1301 is configured to: demodulate first information from a terminal device, where the first information is transmitted based on a first repetition number, the first repetition number is less than or equal to a second repetition number, and the second repetition number is a maximum repeat transmission number of the first information; and start or restart, by the network device, a timer at an actual transmission end moment of the first information when the first information is successfully demodulated, where timing duration of the timer is a sum of first duration and second duration, the first duration is preset duration or duration configured by the network device, the second duration is a difference between third duration and fourth duration, the third duration is a duration required for transmitting the first information based on the second repetition number, and the fourth duration is a duration required for transmitting the first information based on the first repetition number; and the transceiver unit 1302 is configured to send, in PDCCH search space before the timer expires or stops, second information in response to the first information.

In an embodiment of a possible design, the first information is a message 3 in an EDT process, or the first information is information transmitted by using a PUR.

In an embodiment of a possible design, when the first information is the information transmitted by using the PUR, the second information is used to indicate that the network device successfully demodulates the first information, or is used to indicate that the terminal device clears a HARQ buffer corresponding to the first information.

In an embodiment of a possible design, the processing unit 1301 is further configured to start or restart the timer at a scheduling end moment of the first information when demodulation of the first information fails; and the transceiver unit 1302 is further configured to send, in the PDCCH search space before the timer expires or stops, third information in response to the first information, where the third information is used to schedule a retransmission of the first information, or is used to indicate that the network device fails to demodulate the first information, the timing duration of the timer is the preset duration or the duration configured by the network device, and the scheduling end moment of the first information is a transmission end moment of the first information when the first information is transmitted based on the second repetition number.

When the communication apparatus 1300 performs an action of the terminal device in FIG. 9, the transceiver unit 1302 is configured to transmit first information based on a first repetition number, where the first repetition number is less than or equal to a second repetition number, and the second repetition number is a maximum repeat transmission number of the first information;

the processing unit 1301 is configured to start or restart a timer at a transmission start moment of the first information, where timing duration of the timer is a sum of seventh duration and eighth duration, the seventh duration is preset duration or duration configured by a network device, and the eighth duration is a duration required for transmitting the first information based on the second repetition number; and the processing unit 1301 is configured to monitor PDCCH search space by using the transceiver unit 1302 before the timer expires or stops.

In an embodiment of a possible design, the processing unit 1301 is specifically configured to:

before the timer expires or stops, skip monitoring the PDCCH search space within ninth duration, and monitor the PDCCH search space by using the transceiver unit 1302 within tenth duration, where the timing duration of the timer is a sum of the ninth duration and the tenth duration, the ninth duration uses the transmission start moment of the first information as a start time, and the tenth duration uses a moment at which the timer expires or stops as an end time.

When the communication apparatus 1300 performs an action of the network device in FIG. 9, the processing unit 1301 is configured to: demodulate first information from a terminal device, where the first information is transmitted based on a first repetition number, the first repetition number is less than or equal to a second repetition number, and the second repetition number is a maximum repeat transmission number of the first information; and start or restart a timer at an actual transmission end moment of the first information, where timing duration of the timer is a sum of first duration and second duration, the first duration is preset duration or duration configured by the network device, and the second duration is a duration required for transmitting the first information based on the second repetition number; and the transceiver unit 1302 is configured to send, in PDCCH search space before the timer expires or stops, second information in response to the first information.

Figure 14:
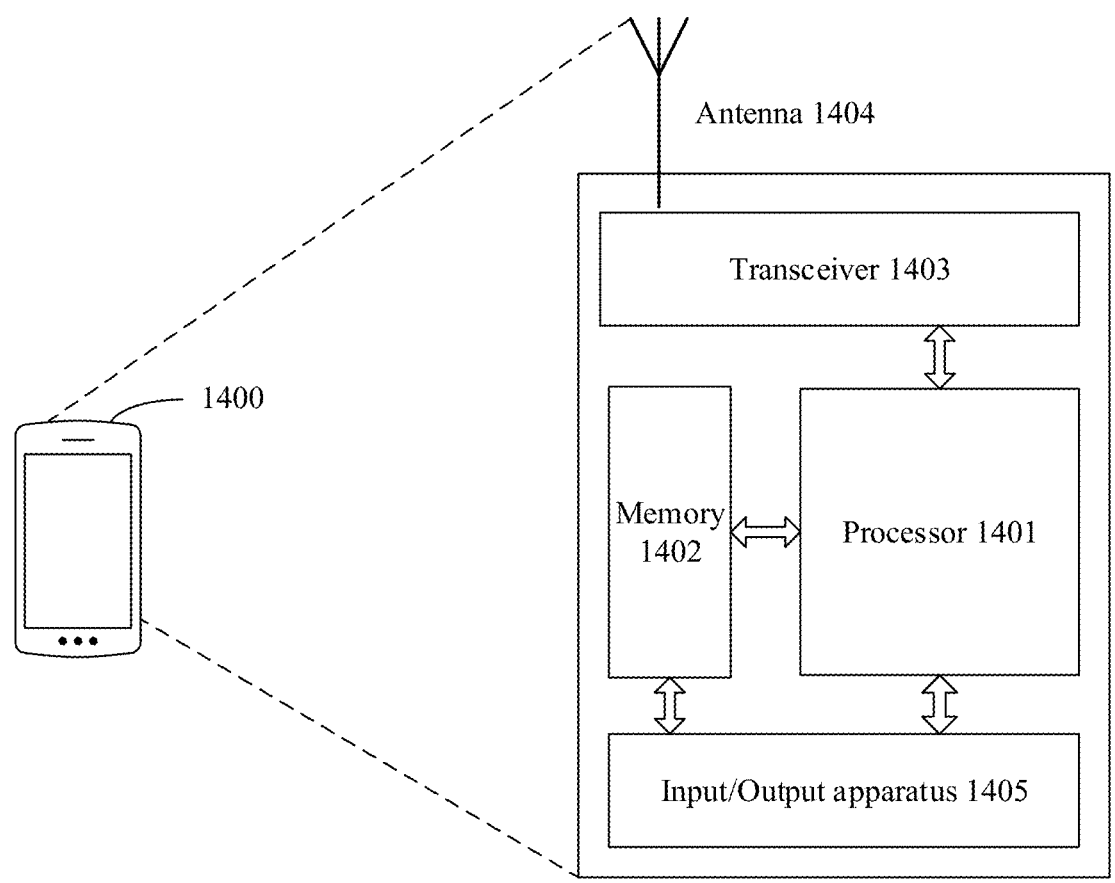
FIG. 14 is a schematic structural diagram of a terminal device according to an embodiment of this application.

FIG. 14 is a schematic structural diagram of a terminal device according to an embodiment of this application. The terminal device shown in FIG. 14 may be an implementation of a hardware circuit of the communication apparatus shown in FIG. 13. The terminal device is applicable to the flowcharts shown in FIG. 2 to FIG. 12, and performs the functions of the terminal device in the foregoing method embodiments. For ease of description, FIG. 14 shows only main components of the terminal device. Optionally, the terminal device may alternatively be an apparatus in the terminal device, for example, a chip or a chip system. The chip system includes at least one chip. The chip system may further include another circuit structure and/or discrete component. As shown in FIG. 14, the terminal device 1400 includes a processor 1401, a memory 1402, a transceiver 1403, an antenna 1404, and an input/output apparatus 1405. The processor 1401 is mainly configured to: process a communication protocol and communication data; control an entire wireless communication apparatus; execute a software program; and process data of the software program. For example, the processor 1401 is configured to support the wireless communication apparatus in performing actions described in the foregoing method embodiments. The memory 1402 is mainly configured to store the software program and the data. The transceiver 1403 is mainly configured to perform conversion between a baseband signal and a radio frequency signal and processing of the radio frequency signal. The antenna 1404 is mainly configured to send and receive a radio frequency signal in an electromagnetic wave form. The input/output apparatus 1405 such as a touchscreen, a display, or a keyboard is mainly configured to receive data input by a user and output data to the user.

In this embodiment of this application, in addition, for specific actions performed by the processor 1401 and the transceiver 1403 in the terminal device 1400, refer to descriptions in the foregoing method embodiments. Details are not described herein again.

Figure 15:
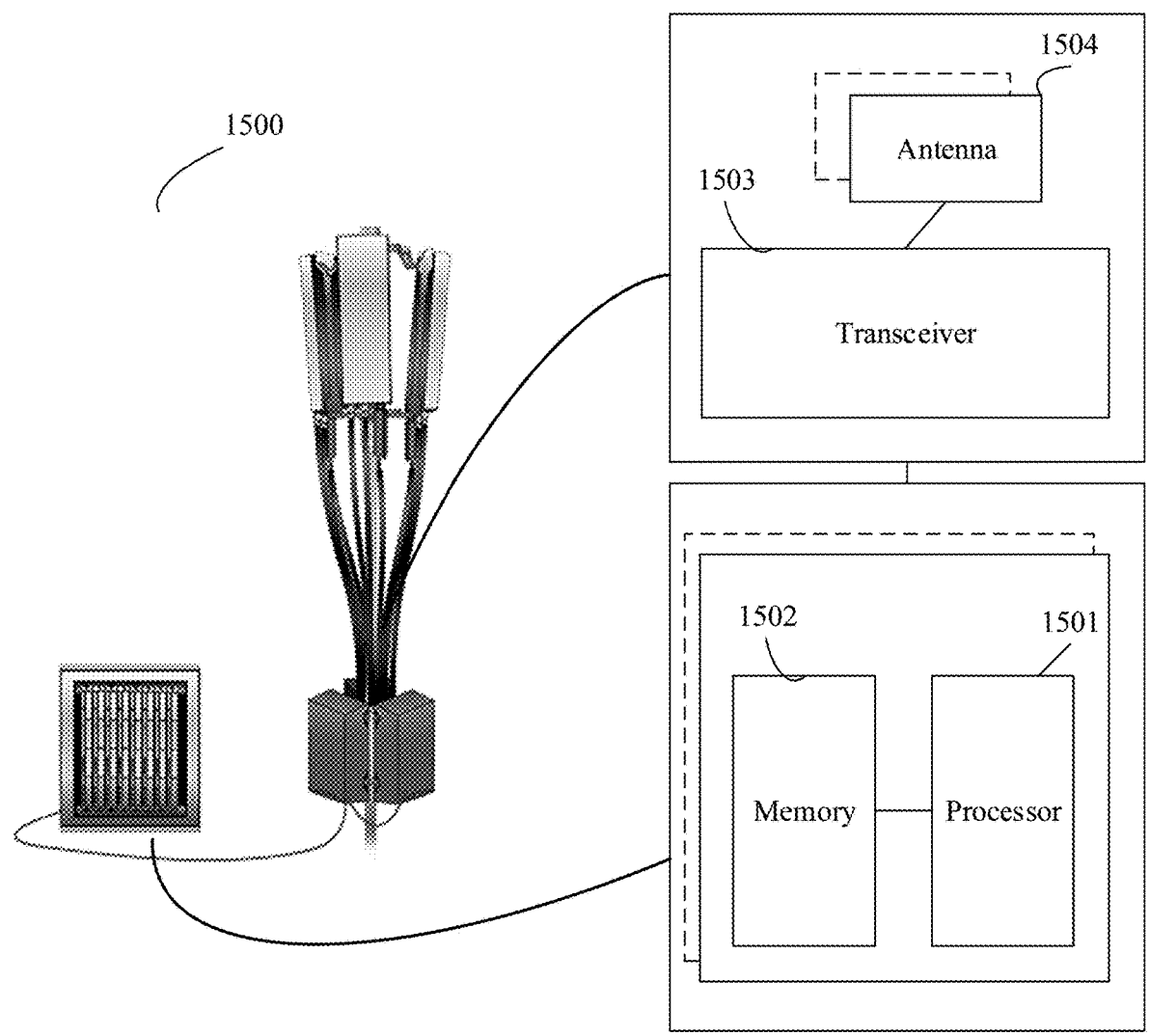
FIG. 15 is a schematic structural diagram of a network device according to an embodiment of this application.

FIG. 15 is a schematic structural diagram of a network device according to an embodiment of this application. The communication apparatus shown in FIG. 15 may be an implementation of a hardware circuit of the communication apparatus shown in FIG. 13. The communication apparatus is applicable to the flowcharts shown in FIG. 2 to FIG. 12, and performs the functions of the network device in the foregoing method embodiments. For ease of description, FIG. 15 shows only main components of the communication apparatus. Optionally, the communication apparatus may be a network device, or may be an apparatus, for example, a chip or a chip system, in a network device. The chip system includes at least one chip, and the chip system may further include another circuit structure and/or discrete component. Optionally, that the communication apparatus is a network device is used as an example. As shown in FIG. 15, the network device 1500 includes a processor 1501, a memory 1502, a transceiver 1503, an antenna 1504, and the like.

In this embodiment of this application, for specific actions performed by the processor 1501 and the transceiver 1503 in the network device 1500, refer to descriptions in the foregoing method embodiments. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or the block diagrams of the method, the device (e.g., system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specified function in one or more processes in the flowcharts and/or in one or more blocks in the block diagrams.

The computer program instructions may alternatively be stored in a computer-readable memory that can indicate the computer or the another programmable data processing device to work in a specified manner, so that the instructions stored in the computer-readable memory are used to generate an artifact that includes an instruction apparatus. The instruction apparatus implements a specified function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A monitoring method, comprising:
   demodulating, by a network device, first information from a terminal device, wherein the first information is transmitted based on a first repetition number, the first repetition number is less than or equal to a second repetition number, the second repetition number is a maximum repeat transmission number of the first information, and each of the first repetition number and second repetition number are positive integers; and
   starting or restarting, by the network device, a timer at a scheduling end moment of the first information, and sending, in a physical downlink control channel (PDCCH) search space before the timer expires or stops, second information in response to the first information, wherein the scheduling end moment of the first information is a transmission end moment for transmission of the first information based on the second repetition number.

2. The method according to claim 1, wherein the first information is a message 3 in an early data transmission (EDT) process.

3. The method according to claim 1, wherein the method further comprises:
   sending, by the network device, first indication information to the terminal device, wherein the first indication information indicates the second repetition number.

4. A communication apparatus, comprising:
   a processor and a memory unit storing program codes for execution by the processor;
   wherein the program codes, when executed by the processor, cause the apparatus to:
   demodulate first information from a terminal device, wherein the first information is transmitted based on a first repetition number, the first repetition number is less than or equal to a second repetition number, the second repetition number is a maximum repeat transmission number of the first information, and each of the first repetition number and second repetition number are positive integers;
   start or restart a timer at a scheduling end moment of the first information, wherein the scheduling end moment of the first information is a transmission end moment for transmission of the first information based on the second repetition number; and
   send, in a physical downlink control channel (PDCCH) search space before the timer expires or stops, second information in response to the first information.

5. The apparatus according to claim 4, wherein the first information is a message 3 in an early data transmission (EDT) process.

6. The apparatus according to claim 4, wherein the program codes, when executed by the processor, further cause the apparatus to:
   send first indication information to the terminal device, wherein the first indication information indicates the second repetition number.

7. A non-transitory computer readable storage medium storing instructions which, when executed by one or more processors, cause the one or more processors to perform operations comprising:
   demodulating first information from a terminal device, wherein the first information is transmitted based on a first repetition number, the first repetition number is less than or equal to a second repetition number, the second repetition number is a maximum repeat transmission number of the first information, and each of the first repetition number and second repetition number are positive integers; and
   starting or restarting a timer at a scheduling end moment of the first information, and sending, in a physical downlink control channel (PDCCH) search space before the timer expires or stops, second information in response to the first information, wherein the scheduling end moment of the first information is a transmission end moment for transmission of the first information based on the second repetition number.

8. The non-transitory computer readable storage medium according to claim 7, wherein the first information is a message 3 in an early data transmission (EDT) process.

9. The non-transitory computer readable storage medium according to claim 7, wherein the operations further comprise:

sending first indication information to the terminal device, wherein the first indication information indicates the second repetition number.

\* \* \* \* \*